E. HIERGESELL.
MEASURING INSTRUMENT.
APPLICATION FILED AUG. 15, 1908.
920,868.
Patented May 4, 1909.
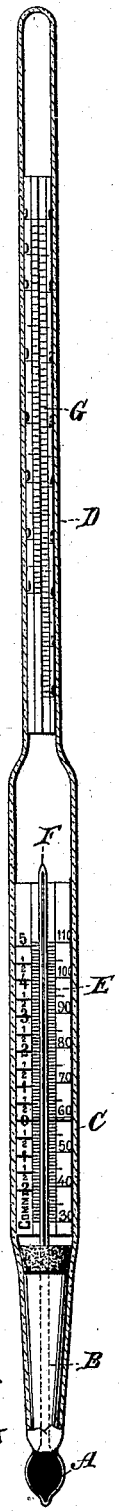
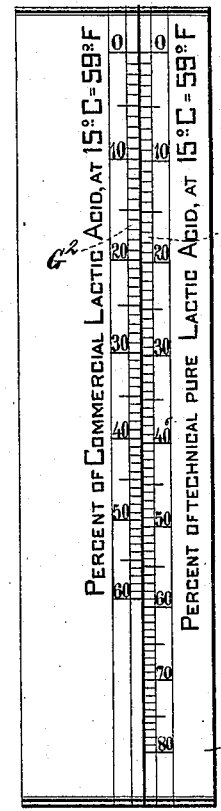
WITNESSES
INVENTOR
Edward Hiergesell
BY
Briesen & Knauth
ATTORNEYS

UNITED STATES PATENT OFFICE.

EDWARD HIERGESELL, OF RICHMOND HILL, NEW YORK, ASSIGNOR TO CLARA LOUISE TAGLIABUE, OF BROOKLYN, NEW YORK.

MEASURING INSTRUMENT.

No. 920,868.      Specification of Letters Patent.      Patented May 4, 1909.

Application filed August 15, 1908. Serial No. 448,679.

*To all whom it may concern:*

Be it known that I, EDWARD HIERGESELL, a subject of the Emperor of Germany, residing at Richmond Hill, Queens county, State of New York, have invented certain new and useful Improvements in Measuring Instruments; and I do hereby declare the following to be a full, clear, and exact description of the invention, such as will enable others skilled in the art to which the same relates to make and use the same.

This invention relates to a class of instruments which depend on the specific density of liquids to regulate the depth of immersion of a vertical float, such, for example, as the hydrometer or lactometer, and has for its object the creation of such an instrument which will automatically show, at that point of the instrument which corresponds to the surface of the liquid the percentage of contents of any important ingredient for which the instrument has been previously prepared. In order to allow for corrections necessarily due to the variations in temperature, I provide the instrument of my invention with certain simple and convenient corrections applied to the thermometer scale.

In the drawings Figure 1 is a front view of the instrument; and Figs. 2 and 3 are illustrative views of the two paper scales flattened out, so as to make the reading plain.

In describing my instrument I will confine myself to one adapted specifically for the measurement of lactic acid, although, of course, the construction applies equally to similar instruments adapted for the measurement of other ingredients of a liquid. The instrument as a whole comprises a hollow glass bulb with the usual weighted thermometer bulb at the bottom, above which is the thermometer chamber.

In the drawings I have designated the four divisions of the instrument as follows: A indicates the thermometer bulb; B the weight; C the float chamber and D the upper tube. The float chamber C contains the thermometer scale E and the thermometer tube F. The upper tube D contains the actual measuring scale G on which is read the percentage of lactic acid in the liquid. The preparation of the scale G is as follows:

"Technically pure lactic acid" contains somewhat less than 80% of pure lactic acid, about 20% of water, and a few per cent. of what may be called "impurities" for the purposes of this description. Experiments have shown that 80% is the average contents of pure lactic acid in what is known as "technically pure" acid on the market. My instrument is therefore first inserted in a "technically pure" acid at a temperature of 15° C., and the surface of the liquid is then taken so as to mark a point shown as 80 on the scale G' of the scale G. Pure water marks the zero point of the scale. The scale is then graduated between zero and 80 in such a manner that each division will accurately designate the actual contents of lactic acid in the mixture. Thus if the mixture contains 10% of "commercial lactic acid" and 90% of water in addition, and the lactic acid is an 80% solution, then the actual per cent. of pure lactic acid is only 8, and the scale is graduated at 8 to show such a percentage; 15% commercially pure lactic acid and 85% water contains only 12% actual lactic acid, and such a mixture is shown by the graduation 12 on the scale. The various possible mixtures of "commercially pure lactic acid" and water are ascertained, reduced to 80% basis, and the scale G' is prepared accordingly.

It will be noted that in order to insure proper readings, the distance between zero and 10 on the scale G' is larger than the distance between 10 and 20, each 10° being narrower than the next. After this scale has been prepared, it is obvious that whatever the percentage of commercially pure lactic acid and water which may exist in the mixture, the measure of the liquid will show on the scale G' the exact amount of actual lactic acid. Thus, if the actual amount is 52%, the instrument will float at the point 52, assuming that the temperature is 15° C. If the temperature is different, the reading can be very readily corrected by the mechanism which I shall refer to later.

What is known as ordinary "commercial lactic acid" as contrasted with "technically pure lactic acid" contains only 60% of actual lactic acid, and the second scale $G^2$ in juxtaposition with the scale G' is prepared for mixtures composed of commercial lactic acid. It will be noted that the figure 60 on the scale $G^2$ corresponds to the graduation 59 on the scale G'; this is due to the fact that the mixture must be read from the top of the instrument toward the surface, because of the dark color of the liquid, and to compensate for the optical defect due to the angle of observation the indication of degree is retarded about the space corresponding to 1° as the maximum, from which it gradually lessens until it disappears entirely at the minimum.

The corrections of the thermometer scale in the bulb C are made as follows: The usual scale H is prominently marked with red ink at 59° F., which corresponds to 15° C. as the zero. For every 10° of heat above this arbitrary zero one point must be added to the percentages read on the scale G, and for every 10° below 1° must be subtracted from the reading of the scale G. Thus, if scale G indicates 52 at 89°, the actual reading is 55%; if the reading is 52 at 94° the corrected reading is 55½%; if the reading is 52 at a temperature of 44, the corrected reading is 50½%. This instrument, therefore, will accurately indicate by means of the surface of the liquid the exact percentage of lactic acid contained in any mixture of either "technically pure lactic acid" or "commercial lactic acid" and water.

I am aware of the fact that there have been instruments heretofore made which will indicate at the surface of the liquid the number of degrees Baumé and the like, and I therefore do not claim such instrument; but What I do claim is:

1. An instrument comprising an upright floating stem composed of four chambers, one for the thermometer bulb, one for the weight, one for the thermometer stem and air chamber, and a fourth for graduations to indicate at the surface of the liquid to be tested the percentage contents of an ingredient at a predetermined temperature, the readings of said last mentioned chamber being smallest at the highest portion thereof and largest at the lowest portion thereof, and corrections indicated on the thermometer scale to compensate for changes in temperature.

2. An instrument for measuring the percentage contents of lactic acid in solution, provided with two sets of graduations in the stem, one set arranged for the indication at the surface of the liquid of the percentage contents of technically pure lactic acid, and the other set to indicate at said point the contents of commercial lactic acid, the readings for the latter set of graduations being retarded about the space of 1° from the correct reading and diminishing gradually in variation from the true reading as the zero point is reached.

3. An instrument for measuring the percentage contents of lactic acid in solution provided with two sets of graduations in the stem, one set arranged for the indication at the surface of the liquid of the percentage contents of technically pure lactic acid, and the other set to indicate at said point the contents of commercial lactic acid, the readings for the latter set of graduations being retarded about the space of 1° from the correct reading and diminishing gradually in variation from the true reading as the zero point is reached, and carrying a thermometer at the lower portion of the instrument, having corrections applied to the scale thereof to compensate for the variations in temperature, the entire instrument adapted to float upright in the liquid.

4. An instrument for measuring the percentage lactic acid in solution, being composed of a hollow glass body containing at its lower end a mercury bulb above which is placed a weight to enable the instrument to stand upright in the liquid, above said weight being an enlarged air chamber into which projects the mercury stem, above said air chamber being located an elongated hollow stem containing on the interior a paper provided with graduations to indicate the percentage contents of the lactic acid in solution, and giving the percentage for both technically pure lactic acid and commercial lactic acid, and the air chamber behind the thermometer stem being also provided with a paper shield containing thermometer readings and corrections to be added or subtracted to or from the reading on the stem to indicate a correct result, according to the variations in temperature.

In testimony whereof I have hereunto set my hand, in the presence of two subscribing witnesses, this 13th day of August, 1908.

EDWARD HIERGESELL.

Witnesses:
JOHN A. KEHLENBECK,
FRED A. KLEIN.